United States Patent
Miller (10) Patent No.: US 7,853,085 B2
(45) Date of Patent: Dec. 14, 2010

(54) VIEWPOINT-INVARIANT DETECTION AND IDENTIFICATION OF A THREE-DIMENSIONAL OBJECT FROM TWO-DIMENSIONAL IMAGERY

(75) Inventor: Michael Miller, Jackson, NH (US)

(73) Assignee: Animetrics, Inc., Jackson, NH (US)

( * ) Notice: Subject to any disclaimer, the term of this patent is extended or adjusted under 35 U.S.C. 154(b) by 1466 days.

(21) Appl. No.: 10/794,943

(22) Filed: Mar. 5, 2004

(65) Prior Publication Data
US 2004/0190775 A1    Sep. 30, 2004

Related U.S. Application Data

(60) Provisional application No. 60/452,429, filed on Mar. 6, 2003, provisional application No. 60/452,430, filed on Mar. 6, 2003, provisional application No. 60/452,431, filed on Mar. 6, 2003.

(51) Int. Cl.
*G06K 9/62* (2006.01)
(52) U.S. Cl. .................. 382/215; 382/107; 382/154
(58) Field of Classification Search ......... 382/190–294; 345/419–423
See application file for complete search history.

(56) References Cited

U.S. PATENT DOCUMENTS

| | | | |
|---|---|---|---|
| 5,742,291 A | 4/1998 | Palm | |
| 5,844,573 A | 12/1998 | Poggio et al. | |
| 5,990,901 A | 11/1999 | Lawton et al. | |
| 6,226,418 B1 | 5/2001 | Miller et al. | |
| 6,249,600 B1 | 6/2001 | Reed et al. | |
| 6,263,089 B1 * | 7/2001 | Otsuka et al. | 382/107 |
| 6,320,578 B1 * | 11/2001 | Shiitani et al. | 345/419 |
| 6,362,833 B2 | 3/2002 | Trika | |
| 6,366,282 B1 * | 4/2002 | Trika | 345/423 |
| 6,381,346 B1 | 4/2002 | Eraslan | |
| 6,434,278 B1 | 8/2002 | Hashimoto | |
| 6,529,626 B1 | 3/2003 | Watanabe et al. | |
| 6,532,011 B1 | 3/2003 | Francini et al. | |
| 6,556,196 B1 | 4/2003 | Blanz et al. | |

(Continued)

FOREIGN PATENT DOCUMENTS

EP    1 039 417 A1 *  3/1999

(Continued)

OTHER PUBLICATIONS

Weisstein, "Matrix Norm," Dec. 22, 2003, http://mathworld.wolfram.com/MatrixNorm.html 2 pages).

(Continued)

*Primary Examiner*—Brian Q Le
*Assistant Examiner*—Tsung-Yun Tsai
(74) *Attorney, Agent, or Firm*—Wilmer Cutler Pickering Hale & Dorr LLP.

(57) ABSTRACT

A method and system for detecting a source multifeatured three-dimensional object from two-dimensional source imagery, and for locating a best-matching three-dimensional object from a candidate database of such objects by performing a viewpoint and lighting invariant search among the candidate objects. The invention further includes the method and system for determining the optimally-fitting viewpoint, lighting, and deformation of the located three-dimensional candidate and basing an identification of the candidate with the source on the quality of fit between projections of the candidate and the source imagery.

48 Claims, 4 Drawing Sheets

U.S. PATENT DOCUMENTS

| 7,340,159 | B2 | 3/2008 | Sugiura et al. |
| 2001/0033685 | A1 | 10/2001 | Ishiyama |
| 2002/0012454 | A1 | 1/2002 | Liu et al. |
| 2002/0106114 | A1 | 8/2002 | Yan et al. |
| 2003/0099409 | A1 | 5/2003 | Rowe |
| 2003/0123713 | A1 | 7/2003 | Geng |
| 2003/0169906 | A1 | 9/2003 | Gokturk et al. |
| 2006/0204069 | A1* | 9/2006 | Le Bras et al. ............... 382/132 |

FOREIGN PATENT DOCUMENTS

| EP | 1 039 417 | 9/2000 |
| EP | 1 143 375 | 10/2001 |
| EP | 1 204 069 | 5/2002 |
| WO | 01/63560 | 8/2001 |

OTHER PUBLICATIONS

Weisstein, "Projective Geometry," Dec. 22, 2003, http://mathworld.wolfram.com/ProjectiveGeometry.html (3 pages).

Eriksson et al., "Towards 3-dimensional face recognition," *IEEE Cape Town*, (Sep. 28, 1999), pp. 401-406.

Hsu et al., "Face modeling for recognition," *Proceedings 2001 International Conference on Image Processing*, vol. 1 (Oct. 7, 2001), pp. 693-696.

International Search Report for PCT/US2004/006604, Sep. 2, 2004; 18 pages.

International Search Report for PCT/US2004/006614, Aug. 26, 2004; 15 pages.

International Search Report for PCT/US2004/006827, Aug. 26, 2004; 15 pages.

Lanitis et al., "Toward Automatic Simulation of Aging Effects on Face Images," *IEEE Transactions on Pattern Analysis and Machine Intelligence*, vol. 24, No. 4 (Apr. 2002), pp. 442-455.

Lee et al., "3-D deformable face model for pose determination and face synthesis," *IEEE Computer Society*, (Sep. 27, 1999) pp. 260-265.

Lopez et al., "3D head pose computation from 2D images: templates versus features," *IEEE Computer Society*, vol. 3 (Oct. 23, 1995), pp. 599-602.

Pighin et al., "Synthesizing realistic facial expressions from photographs," *Computer Graphics Conference Proceedings*, (Jul. 19, 1998), pp. 75-84.

Tang et al., "Face recognition using synthesized intermediate views," *Proceedings of the 38th Midwest Symposium* in Rio de Janeiro, Brazil, (Aug. 13, 1995), pp. 1066-1069.

Rein-Lien Hsu et al., "Face modeling for recognition" Proceedings 2001 International Conference on Image Processing. ICIP 2001. Thessaloniki, Greece, Oct. 7-10, 2001, International Conference on Image Processing, New York, NY: IEEE, US, vol. vol. 1 of 3. Conf. 8, Oct. 7, 2001, pp. 693-696, XP010563858 ISBN: 0-7803-6725-1.

Li-An Tang et al., "Face recognition using synthesized intermediate views" Circuits and Systems, 1995., Proceedings., Proceedings of the 38th Midwest Symposium on Rio De Janeiro, Brazil Aug. 13-16, 1995, New York, NY USA, IEEE, US, Aug. 13, 1995, pp. 1066-1069, XP010165313 ISBN: 0-7803-2972-4.

European Patent Office, Communication Pursuant to Article 96(2) EPC, Sep. 21, 2007.

* cited by examiner

VIEWPOINT-INVARIANT DETECTION AND IDENTIFICATION OF A THREE-DIMENSIONAL OBJECT FROM TWO-DIMENSIONAL IMAGERY

RELATED APPLICATIONS

This application claims priority to and the benefits of U.S. Provisional Applications Ser. Nos. 60/452,429, 60/452,430 and 60/452,431 filed on Mar. 6, 2003 (the entire disclosures of which are hereby incorporated by reference).

FIELD OF THE INVENTION

The present invention relates to object modeling and identification systems, and more particularly to the identification of a target object from two- and three-dimensional input using three-dimensional models of the candidate objects.

BACKGROUND OF THE INVENTION

In many situations it is desirable to be able to identify a three-dimensional (3D) multifeatured object automatically from a set of candidate objects, particularly when only a partial representation of the target object is available. In a typical situation, only one or more two-dimensional (2D) source images of the 3D object may be available, perhaps photographs taken from different viewpoints. Conventional methods of identifying a 3D object using 2D images as input are inherently vulnerable to changes in lighting conditions and varying orientations of the object. For example, in the case where the multifeatured object is a face, existing methods generally use 2D facial photographs as source input. Such photographs will be greatly affected by variations in lighting conditions and viewpoint, yet traditional methods have no way of taking changing lighting or viewpoints into consideration—they simply analyze the 2D image as is. If the source object is not oriented head-on, the efficacy of most methods decreases; the further out of plane the object is, the less reliable the identification becomes.

Accordingly, identification of a 3D multifeatured object from a 2D image can give good results in controlled conditions in which one or more reference images of the object can be taken in advance from the same viewpoints and under the same lighting conditions which prevail when the source image(s) to be used for identification are taken. This situation rarely occurs in practice, however, since the object to be identified may not be available or cooperative, and it is often impossible to predict the orientation and lighting conditions under which the source image(s) will be captured. For example, in the case of face recognition, the source image is often taken by a surveillance camera which may capture a side view, or a view from above. Typically the reference image will be a head-on view, which may be difficult to identify with the source image.

To cope with varying viewpoints, some identification methods capture and store images of the object taken from multiple viewing angles. However, this process is slow and costly, and it would be impractical to capture images corresponding to the possible range of angles and lighting. Another approach is to capture a 3D image of the object by using a 3D imaging device or scanner, and then to electronically generate a number of reference 2D images corresponding to different viewpoints and lighting conditions. This technique is also computationally burdensome and still does not enable the source image(s) to be matched to the continuum of possible rotations and translations of the source 3D object. In another variation, a 3D model of the target object may be created with a generalized model of the type of 3D object which is to be identified. The model may be parameterized, with parameters chosen to make the model correspond to the source 2D imagery. This 3D model may then be used to generate multiple reference 2D images corresponding to different viewpoints and lighting conditions. Since such 3D models typically have only a few degrees of freedom, however, the 3D model will usually not correspond closely to the 3D geometry of the target object, causing an inherent limitation to the accuracy of this approach.

Another challenge faced by object identification systems is to locate the object to be recognized from within a large, cluttered field in an efficient manner. Traditional methods are not hierarchical in their approach, but instead apply computationally intensive matching methods which attempt to match source images with reference images. Such methods are not suitable for rapid object detection and identification.

Accordingly, there exists a need for an automated approach that efficiently locates and identifies a 3D object from source 2D imagery in a manner that is robust under varying lighting conditions and source viewpoints.

SUMMARY OF THE INVENTION

The present invention provides an automated method and system for identifying a 3D multifeatured object when only partial source information representing the object is available. Typically, the source information takes the form of one or more 2D projections of the 3D object, but may also include 3D data, such as from a 3D camera or scanner. The invention uses a set of candidate 3D representations of multifeatured objects, at least one of which is to be identified with the source object should a successful identification be made. In order to detect and locate the position of the source object in the source 2D image, the invention searches for feature points, curves, surfaces, or subvolumes which are characteristic of the 3D object and are substantially invariant under varying viewpoint and lighting. Next, all possible positions (i.e., orientations and translations) for each 3D candidate representation are searched to identify the candidate representation for which the optimal rigid motion (rotation and translation) has a projection which most closely matches the source feature items. The closeness of the match is determined by a measure such as the minimum mean-squared error (MMSE) between the feature items in the projection of the 3D representation and the corresponding feature items in the 2D source image. The comparison is performed in 3D between the estimated deprojected positions of the feature items from the 2D source image and the corresponding feature items of the candidate 3D representation. The rigid motion of the closest-fitting 3D candidate representation is tuned further by comparing portions of the source 2D imagery with corresponding portions of the projected best-fitting 3D representation. The quality of fit between the source imagery and the selected 3D representation in the tuned position is then determined. If the fit rises above a predetermined threshold, the identification is successful.

Thus the identification preferably proceeds in a hierarchical fashion. First, the presence of the object to be identified is detected in the source imagery using a coarse detection technique that rapidly locates a small number of feature items. Second, the candidate representations are searched for correspondence to these feature items across a continuum of possible viewpoints. Third, the optimal position of the best-fitting candidate representation is refined by determining the best match between source imagery and projections of the 3D representation.

In a first aspect, therefore, the invention comprises a method of identifying a multifeatured object corresponding to at least one source 2D projection of a source multifeatured object. In accordance with the method, a set of candidate 3D representations is provided. The source 2D projection is detected within the source imagery and a viewpoint-invariant search of the candidate 3D representations is performed to locate the candidate 3D representation having a 2D projection most resembling the source 2D projection(s). This candidate 3D representation is then compared with the source 2D projection(s) to determine whether the candidate corresponds to the source. In some embodiments, the detection of the source 2D projection is performed by locating viewpoint-invariant and lighting-invariant feature items in the source 2D image. This detection may be performed in real time. Each candidate 3D representation may be searched over a range of possible 2D projections of the 3D representation without actually generating any projections. The search over a range of possible 2D projections may comprise computing a rigid motion of the candidate 3D representation optimally consistent with a viewpoint of the source multifeatured object in at least one of the 2D projections.

In some embodiments, the optimum rigid motion is determined by estimating a conditional mean pose or geometric registration as it relates to feature items comprising points, curves, surfaces, and subvolumes in a 3D coordinate space associated with the candidate 3D representation such that the feature items are projectionally consistent with feature items in source 2D projection(s). MMSE estimates between the conditional mean estimate of the projected feature items and corresponding feature items of the candidate 3D representation are generated. A quality of fit is determined by, for example, comparing portions of the projection of the candidate 3D representation yielding the lowest MMSE estimate and corresponding portions of the source 2D representation, and determining the optimum rigid motion as corresponding to the best quality of fit. If the quality of fit corresponding to the optimum rigid motion exceeds a predetermined threshold, the candidate 3D representation is positively identified with the source object.

In a second aspect, the invention comprises a system for identifying a multifeatured object corresponding to at least one source 2D projection of a source multifeatured object. The system comprises a database comprising a plurality of candidate 3D representations of multifeatured objects, a detection module for detecting the source 2D projection in an image, and an analyzer. The analyzer performs a viewpoint-invariant search of the candidate 3D representations to locate the one having a 2D projection most resembling the source 2D projection(s), and compares the source 2D projection(s) with the located candidate 3D representation to determine whether the candidate corresponds to the source. In some embodiments, the detection module detects the source 2D projection by locating viewpoint-invariant and lighting-invariant feature items in the source 2D image. This detection may be performed in real time. The analyzer may search each candidate 3D representation over a range of possible 2D projections of the 3D representation without actually generating any projections. The search over a range of possible 2D projections may comprise computing a rigid motion of the candidate 3D representation optimally consistent with a viewpoint of the source multifeatured object in at least one of the 2D projections.

In some embodiments, the analyzer determines the optimum rigid motion by estimating a conditional mean pose or geometric registration as it relates to feature items comprising points, curves, surfaces, and subvolumes in a 3D coordinate space associated with the candidate 3D representation such that the feature items are projectionally consistent with feature items in source 2D projection(s). The analyzer generates MMSE estimates between the conditional mean estimate of the projected feature items and corresponding feature items of the candidate 3D representation. The analyzer further generates a quality of fit by, for example, comparing portions of the projection of the candidate 3D representation yielding the lowest MMSE estimate and corresponding portions of the source 2D representation, and determines the optimum rigid motion as corresponding to the best quality of fit. If the quality of fit corresponding to the optimum rigid motion exceeds a predetermined threshold, the analyzer positively identifies the candidate 3D representation with the source object.

In a third aspect, the above described methods and systems are used for the case when the 3D multifeatured object is a face, and the candidate 3D representations are avatars.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION OF THE PREFERRED EMBODIMENT

The invention can be used for identifying any multifeatured object, such as faces, animals, plants, or buildings with one or more candidate 3D representations of generically similar objects. For ease of explanation, however, the ensuing description will focus on faces as an exemplary (and non-limiting) application.

In one embodiment of the invention, the 3D representation of a face is an avatar model. The avatar geometry may be represented by a mesh of points in 3D which are the vertices of set of triangular polygons approximating the surface of the avatar. In one representation, each vertex is given a color value, and each triangular face may be colored according to an average of the color values assigned to its vertices. The color values are determined from a 2D texture map which may be derived from a photograph. The avatar is associated with a coordinate system which is fixed to it, and is indexed by three angular degrees of freedom (pitch, roll, and yaw), and three translational degrees of freedom of the rigid body center in three-space. In addition, individual features of the avatar, such as the chin, teeth and eyes may have their own local coordinates (e.g., chin axis) which form part of the avatar description. The present invention may be equally applied to avatars for which a different data representation is used. For example, texture values may be represented as RGB values, or using other color representations, such as HSL. The data representing the avatar vertices and the relationships among the vertices may vary. For example, the mesh points may be connected to form non-triangular polygons representing the avatar surface.

The avatar(s) used herein may be generated using the method or system described in U.S. Ser. No. 10/794,353, entitled VIEWPOINT-INVARIANT IMAGE MATCHING AND GENERATION OF THREE-DIMENSIONAL MODELS FROM TWO-DIMENSIONAL IMAGERY and filed contemporaneously herewith, the entire contents of which is incorporated by reference.

The invention may include a conventional rendering engine for generating 2D imagery from a 3D avatar. The rendering engine may be implemented in OpenGL, or in any other 3D rendering system, and allows for the rapid projection of a 3D avatar into a 2D image plane representing a camera view of the 3D avatar. The rendering engine may also include the specification of the avatar lighting, allowing for the generation of 2D projections corresponding to varying illuminations of the avatar. As is well known in the art, lighting corresponding to a varying number of light sources of varying colors, intensities, and positions may be generated.

Figure 1:
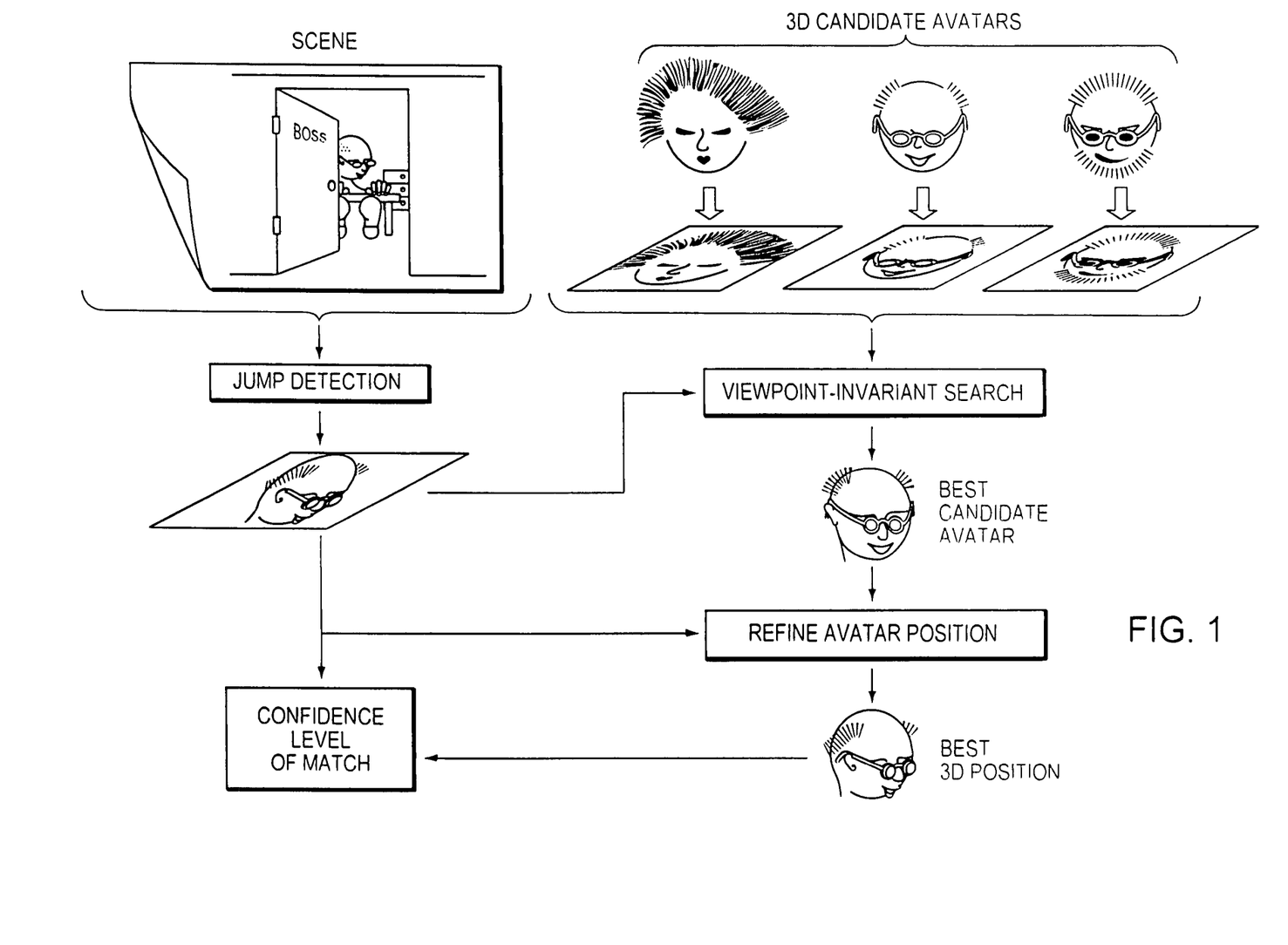
FIG. 1 schematically illustrates the various components of the invention, starting with the scene in which the target to be identified appears and the candidate avatars, and yielding a confidence level of match after performing jump-detection, a viewpoint-invariant search, and refinement of avatar pose and geometry.

FIG. 1 illustrates the basic operation of the invention in the case where the 3D multifeatured object to be identified is a face and the set of candidate 3D representations are avatars. The identification process starts with the determination of a set of facial features which are substantially invariant across different faces under varying lighting conditions and under varying poses. Such features may include brightness order relationships, image gradients, and edges. For example, the relationship between the inside and outside of a nostril would be substantially invariant under face, pose, and lighting variations; or alternatively the change in intensity from the eyebrow to the surrounding skin.

The source image is then scanned automatically to detect the presence of the invariant feature points. Since the number of points being detected is relatively small, typically in the range of 3-100 s, the detection is very rapid, and can be performed in real time as, for example, when a moving image is being tracked. This step of the identification is called "jump-detection," and provides a rapid detection of position and orientation of a face in the image. The technique can be used effectively even when the source imagery includes only a part of the target face, or when the target face is partially obscured, such as, for example, by sunglasses or facial hair. This feature of the present invention allows reliable identification when the quality and extent of source target imagery is poor and is invariant to photometric and geometric change.

As understood by those of ordinary skill in the art, the approach may use Bayesian classifiers and decision trees in which hierarchical detection probes are built from training data generated from actual avatars. The detection probes are desirably stored at multiple pixel scales so that the specific parameters, such as for orientation of a feature, are only computed on finer scales if the larger-scale probes yield a positive detection. The feature-detection probes may be generated from image databases representing large numbers of individuals who have had their features demarcated and segregated so that the detection probes become specifically tuned to these features. Jump-detection may use pattern classification, Bayes nets, neural networks, or other known techniques for determining the location of features in facial images. A preferred technique is based on Bayesian classifiers and decision trees in which hierarchical detection probes are designed from training data generated from the actual instances of the individual avatars so as to make the detection probes optimally efficient. However, the detection probes need not be generated from the avatars themselves. Instead, they can be generated from families of 2D facial images which have been measured or have already been assembled into databases.

Detectors for an individual face are desirably built from imagery rendered at many different scales, positions, rotations, and illuminations of the avatar representing that individual. To increase the efficiency of the detection process, the probes are grouped and classified according to type of pose, such as frontal and side views. The classification scheme is used to decompose the set of possible poses into groups ranging from coarse classifications to fine ones. The coarsest group accounts for all poses in a reference range. When a detection is performed within the coarse group, the probes within the finer range corresponding to the detection are utilized. A face is detected at a given pose if and only if the response is positive of every detector for a group containing the given pose. Such a coarse-to-fine strategy organizes the detectors generated from the avatar database so that most parts of the scene in the source image which do not include a face can be rejected using the coarse probes only using very little computation. The more computationally intensive operations are thereby progressively concentrated in the areas where detections occur.

For purely 3D sources of imagery such as from methods for directly constructing triangulated meshes (structured light, camera arrays, depth finding) detection of features of 0, 1, 2, 3 dimensional points, curves, subsurfaces and subvolumes are detected using hierarchical detections on the 3D geometries from points of high curvatures, principal and gyral curves associated with extrema of curvature, and subsurfaces associated particular surface properties as measured by the surface normals and shape operators. Such photometric invariant features may be generated via such methods as dynamic programming.

Once the location of a face has been detected in the source 2D image, the source image is compared with a set of candidate 3D avatars. The set typically contains as many members as there are candidates for identification for which 3D avatars have been constructed, but the set of candidates may be reduced by manual or other methods if some candidates can be eliminated. The lighting-invariant and pose-invariant features corresponding to those detected in the source 2D imagery are identified in each of the candidate 3D representations. The viewpoint-invariant search then notionally subjects each candidate 3D avatar to all possible rigid motions, projects its features into 2D, compares the features to the corresponding features in the target photograph, and determines the position in three-space of each candidate avatar that best corresponds to the source 2D image. The avatar for which a particular rigid motion provides the closest fit between projected features and those of the source image is selected as the best candidate avatar. In FIG. 1, this best candidate is illustrated as the avatar in the middle of the three avatars shown at top right.

The viewpoint-invariant search is preferably based on the computation of the conditional mean estimate of the reverse projection positions in 3D of the 2D feature items, followed by the computation of MMSE estimates for the rotation and translation parameters in 3D, given the estimates of the 3D positions of the feature items. Since position in 3D space is a vector parameter, the MMSE estimate for translation position is closed form; when substituted back into the squared error function, it gives an explicit function in terms of only the rotations. Since the rotations are not vector parameters, they may be calculated using non-linear gradient descent through the tangent space of the group or via local representation using the angular velocities of the skew-symmetric matrices.

The pose-invariant search of the candidate avatars uses a gradient algorithm which may be optimized for speed and efficiency by various techniques, including the following three approaches. First, the projected imagery that is being compared to each candidate avatar may be aggregated into groups of 8×8, 16×16 and so on, and split up into finer resolution only in the later stages when matching is being performed for the purposes of determining if a positive identification exists. Second, the avatars themselves may be coarsened to reduce the number of points being compared in the initial stages of the search. Third, special-purpose graphics hardware may be deployed to generate avatar projections and image-feature reverse projections rapidly. In addition to or in lieu of the least squares or weighted least squares techniques described herein, the distance metrics used to measure the quality of fit between the reverse projections of feature items from the source imagery and corresponding items in the 3D avatar may be, for example, Poisson or other distance metrics which may or may not satisfy the triangle inequality. Such metrics may include the similitude metric which is invariant to rotation, scale and translation, as well as the Euclidean and spline metrics for small or large deformations.

If feature items measured in 3D are available, such as from actual 3D source data from 3D cameras or scanners, the feature item matching generating the metric correspondence may be performed directly, without the intermediate step of calculating the conditional mean estimate of the deprojected 2D features. The cost function used for positioning the 3D avatar can be minimized using algorithms such as closed form quadratic optimization, iterative Newton descent or gradient methods.

Once the pose-invariant search has determined the best-fitting candidate avatar, and the pose for which the feature matching is optimal, the 3D position of this avatar may be refined using a technique called diffusion-matching, as shown at lower right in FIG. 1. In this technique, projective imagery of the best-fitting candidate avatar in the optimal pose (as determined by the pose-invariant search) is compared directly with source imagery. An expression called the matching energy characterizes the quality of the match between the projected avatar and source imagery in terms of avatar rotation and translation parameters. The matching energy is expanded in a first order Taylor series, and a quadratic form is established for the angular velocity skew-symmetric matrix representing rotation and the linear velocity representing translation. Solving in closed form gives the explicit formula for the translation in terms of angular velocities, and resubstituting gives a quadratic form which only has the skew-symmetric angular velocities. A closed-form expression for these can be calculated, from which the translation velocities can be calculated in closed form. Iterating with these formulas diffuses the avatar head in three-space. The computation involved in the diffusion-matching may be accelerated by coarsening the source image into lattices of 8×8, 16×16, 32×32 or other numbers of pixels. In addition, the avatar models may be coarsened to reduce the number of facets, thereby reducing the required sampling of the projected avatar. When 3D source imagery is available, such as from a 3D camera or a 3D scanner, the diffusion-matching is performed directly in 3D without the need for projection. The optimal pose corresponds to the position and rotation for corresponding to the minimum matching energy. The matching distance corresponding to this pose is a quality of fit measure or a metric distance, and is used to determine whether a positive identification between source imagery and candidate avatar is made, as shown in the lower left of FIG. 1. A positive identification of the source object with the best candidate avatar is made if the matching distance between the projection of the best candidate avatar in the optimal pose and the source imagery exceeds a pre-determined threshold corresponding to a desired confidence level.

To take account of the possible range of lighting prevailing when the source imagery was captured, a set of photometric basis functions representing the entire lighting sphere is computed in order to represent the lighting of each avatar using principal components or another method for generating typical states of lighting. While the diffusion-matching process is adjusting the geometry to find the best pose and small deformation of the best candidate avatar, the lighting which optimizes the match can be selected. The photometric basis of variation is computed for the candidate avatar being generated by positioning the avatar at all positions and poses and variations of the lighting. From this candidate set of lightings the basis function can be generated using principal components analysis or any other technique for generating typical states of photometric illumination. During the diffusion-matching process, the basis functions for photometric illumination can be selected which optimize the matching cost. Photometric variation is accommodated by varying the photometric basis function representing illumination variability to minimize the matching energy. In the projective imagery, these photometric basis functions provide a non-orthogonal basis. Therefore, for each template diffusion step in matching the geometry, there is a closed-form least-squares solution for the photometric basis functions. The diffusion-matching algorithm continually refines the pose (rotation and translation) to decrease the matching energy. The ID algorithm selects the avatar which has smallest matching energy.

The various components of the present invention can be used independently of each other. For example, the jump-detection technique and pose-invariant search need not be used to cue the diffusion-matching process. Alternatively, the pose estimate that results from jump-detection may be used directly to estimate a quality of match to a candidate avatar without performing the pose-invariant search, especially when a reasonable number of features are identified in the 2D source imagery. It is not necessary to use diffusion-matching in order to perform an identification.

The pose-invariant search is now considered without deformation of the candidate avatar. In the following discussion, a 3D candidate avatar is referred to as a CAD (computer-aided design) model, or by the symbol CAD. The set of $x_j = (x_j, y_j, z_j)$, $j = 1, \ldots, N$ features is defined on the CAD model. The projective geometry mapping is defined as either positive or negative z, i.e., projection occurs along the z axis. In all the projective geometry (for negative z-axis $$p_j = \left( \frac{\alpha_1 x_j}{-z_j}, \frac{\alpha_2 y_j}{-z_j} \right)$$

projection), or (for positive z-axis projection) is the projected position of $$p_j = \left( \frac{\alpha_1 x_j}{z_j}, \frac{\alpha_2 y_j}{z_j} \right)$$

the point $x_j$ where $\alpha$ is the projection angle. Let the rigid transformation be of the form $A=O, b: x \mapsto Ox+b$ centered around $x_c=0$. The following data structures are defined throughout:

$$X_j = \begin{pmatrix} x_j^1 & x_j^2 & x_j^3 & 0 & 0 & 0 & 0 & 0 & 0 \\ 0 & 0 & 0 & x_j^1 & x_j^2 & x_j^3 & 0 & 0 & 0 \\ 0 & 0 & 0 & 0 & 0 & 0 & x_j^1 & x_j^2 & x_j^3 \end{pmatrix}. \quad \text{(Equation 1)}$$

The basis vectors $Z_1, Z_2, Z_3$ at the tangent to the 3×3 rotation element O are defined as:

$$Z_1 = 1_1 O^{old} = [o_{21}, o_{22}, o_{23}, -o_{11}, -o_{12}, -o_{13}, 0, 0, 0]^t \quad \text{(Equation 2)}$$

$$Z_2 = 1_2 O^{old} = [o_{31}, o_{32}, o_{33}, 0, 0, 0, -o_{11}, -o_{12}, -o_{13}]^t \quad \text{(Equation 3)}$$

$$Z_3 = 1_3 O^{old} = [0, 0, 0, o_{31}, o_{32}, o_{33}, -o_{21}, -o_{22}, -o_{23}]^t \quad \text{(Equation 4)}$$

$$\text{where } 1_1 = \begin{pmatrix} 0 & 1 & 0 \\ -1 & 0 & 0 \\ 0 & 0 & 0 \end{pmatrix}, \quad \text{(Equation 5)}$$

$$1_2 = \begin{pmatrix} 0 & 0 & 1 \\ 0 & 0 & 0 \\ -1 & 0 & 0 \end{pmatrix}, 1_3 = \begin{pmatrix} 0 & 0 & 0 \\ 0 & 0 & 1 \\ 0 & -1 & 0 \end{pmatrix},$$

with the notation $(\cdot)^t$ indicating a matrix transpose.

The viewpoint-invariant search determines the optimal rotation and translation for the candidate avatars using the feature items as follows. Given the projective points $p_j$, $j=1, 2, \ldots$, and a rigid transformation of the form $O, b: x \mapsto Ox+b$ (centered around center $x_c=0$), the projective points for positive (i.e., $z>0$) are given by $$p_j = \left( \frac{\alpha_1 x_j}{z_j}, \frac{\alpha_2 y_j}{z_j} \right).$$

For positive (i.e., $z>0$) mapping with $$p_i = \left( \frac{\alpha_1 x_i}{z_i}, \frac{\alpha_2 y_i}{z_i} \right),$$

$i=1, \ldots, N$, the 3×9 matrix $M_i = X_i - \bar{Q}^{-1} X_Q$ is computed with the identity matrix $$I = \begin{pmatrix} 1 & 0 & 0 \\ 0 & 1 & 0 \\ 0 & 0 & 1 \end{pmatrix}$$

giving $$P_i = \begin{pmatrix} \frac{p_{i1}}{\alpha_1} \\ \frac{p_{i2}}{\alpha_2} \\ 1 \end{pmatrix}, Q_i = \left( I - \frac{P_i (P_i)^t}{\|P_i\|^2} \right), \bar{Q} = \sum_{i=1}^N Q_i, X_Q = \sum_{i=1}^N Q_i X_i. \quad \text{(Equation 6)}$$

The cost function is evaluated exhaustively, choosing the minimum $$\min_{z, O, b} \sum_{i=1}^N \|Ox_i + b - z_i P\|_i^2 = \min_{O, b} \sum_{i=1}^N (Ox_i + b)^t Q_i (Ox_i + b), \quad \text{(Equation 7)}$$

and determining the translation at the minimum only, where $\hat{b} = -(\sum_{i=1}^n Q_i)^{-1} \sum_{i=1}^n Q_i \hat{O} x_i$. The minimum is obtained via brute force search or running a search algorithm to convergence:

$$BruteForce: \hat{O} = \arg\min_O O^t \left( \sum_{i=1}^N M_i^t Q_i M_i \right) O; \quad \text{(Equation 8)}$$

$$Gradient\, O^{new} = e^{\sum_{i=1}^3 \alpha_i^{new} 1_i} O^{old}, \quad \text{(Equation 9)}$$

$$\alpha_j^{new} = <2 \left( \sum_{i=1}^N M_i^t Q_i M_i \right) O^{old}, Z_j >, \quad j = 1, 2, 3$$

with $<f, g> = \sum_{i=1}^3 f_i g_i$.

In a typical situation, there will be prior information about the position of the object in three-space. For example, in a tracking system the position from the previous track will be available. The present invention can incorporate such information as follows. Given a sequence of points $p_i$, $=1, \ldots, N$ and a rigid transformation of the form $O, b: x \mapsto Ox+b$ (centered around $x_c = 0$), the MMSE of rotation and translation $\hat{O}$, $\hat{b}$ satisfies:

$$\min_{z, O, b} \sum_{i=1}^N \|Ox_i + b - z_i P\|_i^2 + (b - \mu)^t \Sigma^{-1} (b - \mu) = \quad \text{(Equation 10)}$$

$$\min_{O, b} \sum_{i=1}^N (Ox_i + b)^t Q_i (Ox_i + b) + (b - \mu)^t \Sigma^{-1} (b - \mu).$$

The 3×9 matrix $M_i$ and the 3×1 column vector:

$$M_i = X_i - \bar{Q}_\Sigma^{-1} X_Q, N = \bar{Q}_\Sigma^{-1} X_Q, \bar{Q}_\Sigma = (\bar{Q} + \Sigma^{-1}), \psi = \bar{Q}_\Sigma^{-1} \Sigma_\mu,$$
$$\phi = \bar{Q}_\Sigma^{-1} \Sigma_\mu - \mu, \Sigma_\mu = \Sigma^{-1} \mu \quad \text{(Equation 11)}$$

are computed.

Next, the translation $\hat{b} = -\bar{Q}_\Sigma^{-1} X_Q \hat{O} + \bar{Q}_\Sigma^{-1} \Sigma_\mu$ at minimum $\hat{O}$ is obtained by exhaustive search or gradient algorithm run until convergence:

$$BruteForce: \hat{O} = \arg\min_O O^t \left( \sum_{i=1}^N M_i^t Q_i M_i + N^t \Sigma^{-1} N \right) O + \quad \text{(Equation 12)}$$

$$2 O^t \left( \sum_{i=1}^N M_i^t Q_i \psi - N \Sigma^{-1} \phi \right)$$

$$Gradient: O^{new} = e^{\sum_{i=1}^3 \alpha_i^{new} 1_i} O^{old}, \alpha_j^{new} \quad \text{(Equation 13)}$$

$$= <2 \left( \sum_{i=1}^N M_i^t Q_i M_i + N^t \Sigma^{-1} N \right) O^{old} +$$

$$2 \sum_{i=1}^N M_i^t Q_i \psi - N^t \Sigma^{-1} \phi, Z_j >,$$

with the projection onto the basis vectors $Z_1, Z_2, Z_3$ of equations 9 and 13 defined at the tangent to $O^{old}$ in the exponential representation where $\alpha^{new}$ are the directional derivatives of the cost function.

As indicated above, if feature items measured in 3D are available, such as from actual 3D source data from 3D cameras or scanners, the feature item matching may be performed directly, without the intermediate step of calculating the conditional mean estimate of the deprojected 2D features. The cost function used for positioning the 3D avatar can be minimized using algorithms such as closed form quadratic optimization, iterative Newton descent or gradient methods.

The technique is now generalized to include source imagery with arbitrary view angles. Let the image plane be the indexed sequence of pixels indexed by $p \in [0,1]^2$, with the projection mapping points $x=(x,y,z)\in \mathbb{R}^3 \mapsto p(x)=(p_1(x),p_2(x))$ where $$p_1(x) = \frac{\alpha_1 x}{z+n}, \ p_2(x) = \frac{\alpha_2 y}{z+n}, \ \alpha_1 = \frac{2n}{w}, \ \alpha_2 = \frac{2n}{h},$$

where n=cotangent of angle of view, w, h are width and height which determine the aspect ratio. For the discrete setting of pixels in the projective image plane with color (R,G, B) template, the observed projective $\Pi(p)$ is an (R,G, B) vector. The projective matrix becomes $$P_x = \begin{pmatrix} \frac{\alpha_1}{z+n} & 0 & 0 \\ 0 & \frac{\alpha_2}{z+n} & 0 \end{pmatrix},$$

operating on points $(x,y,z)\in \mathbb{R}^3$ according to the projective matrix $$P_x:(x,y,z) \mapsto (p_1(x,y,z), p_2(x,y,z)) = \begin{pmatrix} \frac{\alpha_1}{z+n} & 0 & 0 \\ 0 & \frac{\alpha_2}{z+n} & 0 \end{pmatrix}\begin{pmatrix} x \\ y \\ z \end{pmatrix},$$

the point x(p) being the point on the 3D CAD model which projects to the point p in the image plane. Then the projected template matrices resulting from finite differences on the (R,G,B) components at the projective coordinate p of the template value are derived, and the norm is interpreted componentwise:

$$\nabla^t \Pi(p) = \begin{pmatrix} \frac{\partial}{\partial p_1}\Pi(p)^r & \frac{\partial}{\partial p_2}\Pi(p)^r \\ \frac{\partial}{\partial p_1}\Pi(p)^g & \frac{\partial}{\partial p_2}\Pi(p)^g \\ \frac{\partial}{\partial p_1}\Pi(p)^b & \frac{\partial}{\partial p_2}\Pi(p)^b \end{pmatrix}, \quad \text{(Equation 14)}$$

-continued $$\tilde{\nabla}^t \Pi(p) = \nabla^t \Pi(p) P_{x(p)} \quad \text{(Equation 15)}$$

$$= \begin{pmatrix} \frac{\partial \Pi(p)^r}{\partial p_1}\frac{\alpha_1}{z(p)+n} & \frac{\partial \Pi(p)^r}{\partial p_2}\frac{\alpha_2}{z(p)+n} & 0(24) \\ \frac{\partial \Pi(p)^g}{\partial p_1}\frac{\alpha_1}{z(p)+n} & \frac{\partial \Pi(p)^g}{\partial p_2}\frac{\alpha_2}{z(p)+n} & 0(25) \\ \frac{\partial \Pi(p)^b}{\partial p_1}\frac{\alpha_1}{z(p)+n} & \frac{\partial \Pi(p)^b}{\partial p_2}\frac{\alpha_2}{z(p)+n} & 0 \end{pmatrix},$$

with matrix norm $$||A-B||^2 = |A^r-B^r|^2 + |A^g-B^g|^2 + |A^b-B^b|^2 \quad \text{(Equation 16)}$$

As understood by those of ordinary skill in the art, forward differences, backward differences, or balanced differences can be used to represent the derivatives in the image plane. The capital representation is used to denote the reordered matrix of rotation $O=(o_{11}, o_{12}, o_{13}, \ldots, o_{31}, o_{32}, o_{33})^t$, and then $$\underset{3\times 33\times 1}{o\ x} = \underset{3\times 9}{X}\ \underset{9\times 1}{O}.$$

The following matrices are required throughout:

$$\dot{I}(p)=I(p)-\Pi(p),\ Q(p)=\tilde{\nabla}\Pi(p)\tilde{\nabla}^t\Pi(p),\ M(p)= \\ \dot{I}(p)\nabla\Pi(p)+Q(p)x(p),\ \overline{Q}=\Sigma_p Q(p), \quad \text{(Equation 17)}$$

$$\overline{M}=\Sigma_p M(p),\ \tilde{X}(p)=X(p)-\overline{Q}^{-1}X_Q,\ X_Q=\Sigma_p Q(p)X(p), \\ \tilde{X}_M = \Sigma_p M(p)^t \tilde{X}(p) \quad \text{(Equation 18)}$$

The estimation of translation and rotation of the avatar using a single source image proceeds as follows. The given image $I(p)$, $p\in[0,1]^2$ is modeled with projective mean field $\Pi(p)(o\cdot +b)$ flowing under the Euclidean transformation $$x = \begin{pmatrix} x \\ y \\ z \end{pmatrix} \mapsto ox + b, \text{ where} \quad \text{(Equation 19)}$$

$$o = \begin{pmatrix} o_{11} & o_{12} & o_{13} \\ o_{21} & o_{22} & o_{23} \\ o_{31} & o_{32} & o_{33} \end{pmatrix},\ b = \begin{pmatrix} b_x \\ b_y \\ b_z \end{pmatrix}.$$

The problem is to estimate the rotation and translation o, b such that $$\min_{o,b} \sum_{p\in[0,1]^2} ||I(p)-\Pi(o,b,p)||^2 \approx \quad \text{(Equation 20)}$$

$$\min_{o,b} \sum_{p\in[0,1]^2} ||I(p)-\Pi(p)-\nabla^t \Pi(p) P_{x(p)}(ox(p)+b-x(p))||^2$$

First the above matrices and adjusted points $\overline{Q},\overline{M},\tilde{X}_Q,\tilde{X}(p)$, $\tilde{X}_M$ are computed. Then the optimizing rotation/translation $\hat{O}$, $\hat{b}$ is solved as follows:

$$\hat{O} = \underset{O}{\arg\min} -2O^t \tilde{X}_M^t + O^t \left( \sum_{p \in [0,1]^2} \tilde{X}(p)^t Q(p) \tilde{X}(p) \right) O; \quad \text{(Equation 21)}$$

$$\hat{b} = \overline{Q}^{-1} \overline{M} - \overline{Q}^{-1} X_Q \hat{O} \quad \text{(Equation 22)}$$

In the situation where targets are tracked in a series of images, and in some instances when a single image only is available, knowledge of the position of the center of the target will often be available. This knowledge can be incorporated by placing the target position at the centered position 0. Given the image I(p), P∈[0,1]² under the Euclidean transformation, the minimization problem now becomes $$\min_{o,b} \sum_{p \in [0,1]^2} \|I(p) - \Pi(p) - \nabla^t \Pi(p)(ox(p) - x(p) + b)\|^2 + \quad \text{(Equation 23)}$$

$$b^t \Sigma b.$$

If the mean position is not zero, but is μ, b is redefined as b=b̃−μ; and the estimate of position b is adjusted by adding μ to give the true optimum translation estimate b̃=b+μ.

Adjusted points and matrices are defined as follows:

$$\tilde{X}(p) = X(p) - (\overline{Q} + \Sigma)^{-1} X_Q, \quad \text{(Equation 24)}$$

$$X_Q = \sum_p Q(p) X(p),$$

$$\tilde{X}_Q = \sum_p Q(p) \tilde{X}(p) = X_Q - \overline{Q}(\overline{Q} + \Sigma)^{-1} X_Q,$$

$$\tilde{X}_M = \sum_p M(p)^t \tilde{X}(p), \quad Q_\Sigma = \overline{Q} + \Sigma.$$

The optimizing rotation/translation $\hat{O}, \hat{b}$ is solved as follows:

$$\hat{O} = \arg\min_O -2O^t (\tilde{X}_M^t - X_Q^t Q_\Sigma^{-1} (\overline{M} - \overline{Q} Q_\Sigma^{-1} \overline{M} + \Sigma Q_\Sigma^{-1} \overline{M})) + +O^t (\Sigma_{p \in [0,1]^2} \tilde{X}(p)^t Q(p) \tilde{X}(p) + X_Q^t Q_\Sigma^{-1} \Sigma Q_\Sigma^{-1} X_Q) O \quad \text{(Equation 25)}$$

$$\hat{b} = Q_\Sigma^{-1} \overline{M} - Q_\Sigma^{-1} X_Q \hat{O} = (\overline{Q} + \Sigma)^{-1} \overline{M} - (\overline{Q} + \Sigma)^{-1} X_Q \hat{O}. \quad \text{(Equation 26)}$$

In other cases, a series of images may be available which are similar except for changes in the facial expression of the target. In order to track such changes, or even to locate a face with a changed expression in a single frame, the motions may be parametrically defined via an expression basis $E_1, E_2, \ldots$ defined as functions which describe how the points moves on the face associated with "smile", "eyebrow lift" and other expressions. Given the image I(p), p∈[0, 1]² transformed by the changed expression, the problem is to estimate the coefficients $e_1, e_2, \ldots$ describing the magnitude of each expression such that $$\min_{o,b} \sum_{p \in [0,1]^2} \|I(p) - I(p) - \nabla^t \Pi(p)(ox(p) - \quad \text{(Equation 27)}$$

$$x(p) + b + \sum_i e_i E_i(x(p)))\|^2.$$

The optimal ô, b̂ may be computed using the techniques described above, as the optimum expressions may be computed for the optimum rigid motion as determined above, or the optimum expressions and rigid motions may be computed simultaneously.

For example, the expression for jaw motion may correspond to a large deformation such that the flow of jaw particles follow a rotation around the fixed jaw axis according to O(γ):p→O(γ)p where O rotates the jaw points around the jaw axis γ.

Extreme expressions correspond to large deformations with $\phi: x \mapsto \phi(x)$ satisfying $\phi = \phi_1, \phi_t = \int_0^t v_s(\phi_s(x)) ds + x$, x∈CAD. The deformation of the CAD model constructing the mapping $x \mapsto \phi(x), x \in CAD$ is generated:

$$\min_v \sum_{p \in [0,1]^2} \|I(p) - I(p) - \nabla^t \Pi(p)(\phi(x(p)) - x(p))\|^2. \quad \text{(Equation 28)}$$

To combine the rigid motions with the large deformations the transformation $x \mapsto \phi(x)$, x∈CAD is defined relative to coordinates which have already been transformed by the rigid motions, implying that the transformations are composed, or are deformed simultaneously as in Equation 27 and are optimized together.

The diffusion-matching technique may be used both for the case when only 2D source information (such as one or more photographs) is available, or when source measurements performed directly in 3D are available, such as from actual 3D measurement sets corresponding to 3D cameras. In the latter case, diffusion-matching is performed directly in 3D space without the step of projecting the current avatar configuration onto the image plane.

During both the pose-invariant search and the diffusion-matching process for refining avatar position and shape, the notional lighting on the candidate avatar is varied so as to enable optimal matching to the lighting conditions that prevail in the available source 2D and/or 3D data. For the pose-invariant search, the candidate lighting is determined via inner products based on kernels defined from the source feature items. Thus, although the feature items have characteristics which are independent of lighting, once they have been detected they can be used to extract information about the source lighting conditions.

During the diffusion-matching process, the candidate set of lightings is determined by adjusting the photometric basis variation components. The photometric basis of variation is computed for the candidate avatar being generated by positioning the avatar at all positions and poses and varying the lighting. From this candidate set of lightings the basis functions can be generated using principal components analysis or any other suitable technique for generating typical states of photometric illumination. Since the photometric basis functions provide a non-orthogonal basis, there is a closed-form least-squares solution for the functions for each step of the diffusion-matching. The diffusion-matching process refines the candidate avatar rotation and translation to decrease the matching cost. The basis functions for photometric illumination which minimize the matching cost are selected.

In general the textured lighting field T(x), x∈CAD can be written via a basis describing all possible variations. This basis is computed using principal components on the CAD model by varying all possible illuminations and computing the principle components using the method of variations. The projected texture field (hereafter l), is modeled as PT(p), p∈[0,1]2 indexed over the image, with the texture field $T(x)=\Sigma_{i=1}^d t_i\phi_i(x)$. The transformation o, b, e, v is initialized to be identity transformation, and the following iteration is performed. First, the d×d matrix $$F(o, b, e, v) = \left(\frac{1}{\sigma^2}\langle P\phi_i(o, b, e, v), P\phi_j(o, b, e, v)\rangle + \frac{1}{\lambda_i^2}\delta(i-j)\right) \quad \text{(Equation 29)}$$

is computed. Second, the optimum $t_1, t_2, \ldots$ for each (o, b, e, v) using projected bases $P\phi$:

$$\begin{pmatrix} \bar{t}_1 \\ \vdots \\ \bar{t}_d \end{pmatrix} = F(o, b, e, v)^{-1} \begin{pmatrix} \frac{\langle I, P\phi_1(o, b, e, v)\rangle}{\sigma^2} \\ \vdots \\ \frac{\langle I, P\phi_d(o, b, e, v)\rangle}{\sigma^2} \end{pmatrix} \quad \text{(Equation 30)}$$

is computed. Third, o, b, e, v are varied to generate the minimum cost match using techniques described above. These three steps are iterated until convergence occurs.

A typical case arises when the source imagery includes just a single measured photograph I of the individual face. A collection of avatar models $\{CAD^a, a=1, \ldots, A\}$, is provided. The task is to select the avatar model which is most representative of the individual image being analyzed, incorporating both unknown rotations and translations of the head. Each of the candidate avatars $a=1, \ldots, A$ has a projected texture field $\Pi^a$. In a typical implementation, each texture field $\Pi^a$ is first loaded into a rendering buffer for projection. The rotation, translation and lighting are parameters which optimally fit the candidate avatar to the photograph are calculated using the appropriate pose-invariant search techniques described above, and solving for best match, or minimum value of the cost function for each avatar:

$$C(a) = \min_{o,b,t} \sum_{p\in[0,1]^2} \langle I(p) - \Pi^a(p) - \nabla^t \Pi^a(p)P_{x(p)}(ox(p)+b-x(p))\rangle^2. \quad \text{(Equation 31)}$$

The avatar â which has the lowest cost $\hat{a}=\arg_{min_a} C(a)$ is selected as the closest match. If landmarks are available $p_1, p_2, \ldots$, the cost is adjusted to include the extra term $\Sigma_i(Ox_i+b)^tQ_i(Ox_1+b)$.

In the case where multiple photographs $I^{(v)}, v=1, \ldots, V$ are available, a series of costs are obtained $\Sigma_{v=1}^V C^{(v)}(a)$ for each avatar, and the minimum is selected:

$$\hat{a}=\arg_{min_a}\Sigma_{v=1}^V C^{(v)}.$$

The invention is able to take account of changes in the source imagery caused by different expressions on the target face. Given is a collection of avatar models $\{CAD^a, a=1, \ldots, A\}$, and a single measured photograph I of the target face; the task is to select the ID of the avatar model which is most representative of the individual photograph being analyzed incorporating both rotation, translation, and possible changes in geometry resulting from facial expression. Each of the candidate avatars $a=1, \ldots, A$ is first loaded into a rendering buffer for projection. The rotation, translation, expressions and lightings which optimally fit the candidate avatar to the photograph are calculated using the appropriate techniques described above, and the minimum cost for each avatar is solved for as follows:

$$C(a) = \min_{o,b,e,t\infty} \sum_{p\in[0,1]^2} \left\| I(p) - \Pi^a(p) - \nabla^t \Pi^a(p)P_{x(p)} \right. \quad \text{(Equation 32)}$$
$$\left. \left(ox(p)+b-x(p)+\sum_i e_i E_i(x(p))\right)\right\|^2.$$

The avatar â which has the lowest cost $\hat{a}=\arg_{min_a}C(a)$ is selected as the closest match. In the case when multiple photographs $I^{(v)}, v=1, \ldots, V$ are available, a series of costs are obtained $\Sigma_{v=1}^V C^{(v)}(a)$ for each avatar, and the minimum is selected:

$$\hat{a}=\arg_{min_a}\Sigma_{v=1}^V C^{(v)}.$$

For example, for jaw motion, the expression may correspond to a large deformation in which the flow of jaw particles follow a rotation around the fixed jaw axis according to $O(\gamma)$: $p\rightarrow O(\gamma)p$ where O rotates the jaw points around the jaw axis $\gamma$. For extreme expressions corresponding to large deformation, $\phi: x\mapsto\phi(x)$ satisfying $\phi=\phi_1, \phi_t=\int_0^t v_s(\phi_s(x))ds+x$, $x\in CAD$. The deformation of the CAD model and construction of the mapping $x\mapsto\phi(x), x\in CAD$ gives a cost function $$C(a) = \min_v \sum_{p\in[0,1]^2} \left\| I(p) - I(p) - \nabla^t \Pi(p)(\phi(x(p))-x(p))\right\|^2. \quad \text{(Equation 33)}$$

The cost function calculation shown in Equation 32 can also include rotation and translation.

The present invention may also take into account small changes in source geometry, including those not necessarily caused by facial expression. Examples include changes caused by aging, plastic surgery, or weight change. Given is a collection of avatar models $\{CAD^a, a=1, \ldots, A\}$, and a single measured photograph I of the target face; the invention is to select the ID of the avatar model which is most representative of the individual photograph being analyzed incorporating both rotation, translation, expressions and possible small changes in geometry. The small changes in geometry are represented via $\phi: x\mapsto x+v(x)$ and large deformation $\phi: x\mapsto\phi(x)$ satisfying $\phi=\phi_1, \phi_t=\int_0^t v_s(\phi_s(x))ds+x$, $x\in CAD$. First, each of the candidate avatars $a=1, \ldots, A$ are loaded into a rendering buffer for projection. The rotation, translation, expressions, and lightings which optimally fit the candidate avatar to the photograph are calculated using the appropriate previous inventions and the minimum cost for each avatar is solved for as follows:

$$C(a) = \min_{o,b,e,v,t} \sum_{p\in[0,1]^2} \left\| I(p) - \Pi^a(p) - \nabla^t \Pi^a(p)P_{x(p)} \right. \quad \text{(Equation 34)}$$
$$\left. \left(ox(p)+b-x(p)+\sum_i e_i E_i(x(p)+v(p))\right)\right\|^2.$$

The avatar â which has the lowest cost $\hat{a}=\arg\min_a C(a)$ is selected as the closest match. For ID from multiple photographs $I^{(v)}$, $v=1, \ldots, V$, a series of costs is obtained $\Sigma_{v=1}^{V} C^{(v)}(a)$ for each avatar, and the minimum is selected:

$$\hat{a} = \text{argmin}_a \Sigma_{v=1}^{V} C^{(v)}.$$

For large deformations the cost function in Equation 34 is adjusted to accommodate the large deformation $\phi: x \mapsto \phi(x)$.

When 3D measurements of the source object are available, all of the above techniques may be used as described herein with the indexing proceeding over the image $I(p)$, $p \in 3D$ lattice which may be a dense volume, or a triangulate mesh of the head, such as from a 3D scan (e.g., a so-called "cyberscan"). In this case, the template $\Pi$ does not represent the projection of the object to 2D projective geometry, but rather is the 3D representation of the template CAD model specified by the rotation/translation, expressions, deformations, and lighting parameters o, b, e, v, t. The above techniques are adapted by computing directly over the 3D lattice indices as follows:

$$\min_{o,b,e,v,t} \sum_{x \in 3Dlattice} \left\| I(x) - \prod(o, b, e, x) \right\|^2 \approx$$ (Equation 35)

$$\min_{o,b,e,v} \sum_{x \in 3Dlattice} \left\| I(x) - \prod(x) - \nabla^t \prod(x)(ox(p) + b + \sum_i e_i E_i(x) + v(x)) \right\|^2.$$

To accommodate large deformations in the 3D measurements the transformation $\phi: x \mapsto \phi(x)$ is included in the Equation rather than via small additive transformations.

There are circumstances where there is no direct z information, so that movement in z is equivalent to changing scale in the image plane. The scales is a linear parameter which varies non-linearly with changes in z. The sequence of rotations/translations (five parameters) and scale are determined in a manner directly analogous to the techniques described above in all of the expressions involving the scale and rotation.

The following describes the technique of the invention when source video imagery is available. Given the sequence of imagery $I_n(p)$, $n \geq 0$, $p \in [0,1]^2$ modeled as a Gaussian random field with $I_n+(p)$ having mean field $\Pi_n(p)(o(n) \cdot + b(n))$ flowing under the Euclidean transformation, the sequence of rotations and translations $o(t)$, $b(t)$ or equivalently "velocities" $v(\cdot, n) = (o - id) \cdot + b$, $n=1, 2, \ldots$ are estimated, such that $$\min_{o,b} \sum_{p \in [0,1]^2} \left\| I_{n+1}(p) - \prod_n (o, b, p) \right\|^2 \approx$$ (Equation 36)

$$\min_{o,b} \sum_{p \in [0,1]^2} \left\| I_{n+1}(p) - \prod_n (p) - \nabla^t \prod_n (p) P_{x(p)}(ox(p) + b - x(p)) \right\|^2$$

For each n, the techniques described above, including prior target position information and scale information, may be used to generate $\hat{o}(n), \hat{b}(n), \hat{s}(n), \hat{e}(n), \hat{t}(n)$, (i.e., the optimal rotations, translations, scales, and expressions) by including them in the optimization as in Equation 35 above. Similarly if projective landmark points are available $p_{in}, p_{in}, \ldots, n > 0$, $i=1, 2, \ldots$, the cost is changed to the landmark cost for matching as described above.

The techniques presented herein for identifying a source using candidate avatars can be used in tandem with currently existing 2D face-recognition methods. This can serve to increase the confidence of an identification, and reduce false positives. In this situation, the ID is reduced to checking the subset $\overline{A} \subset A$ of avatars which have been detected using any preexisting approach, and filtering them using the avatar-based techniques presented herein.

Figure 2:
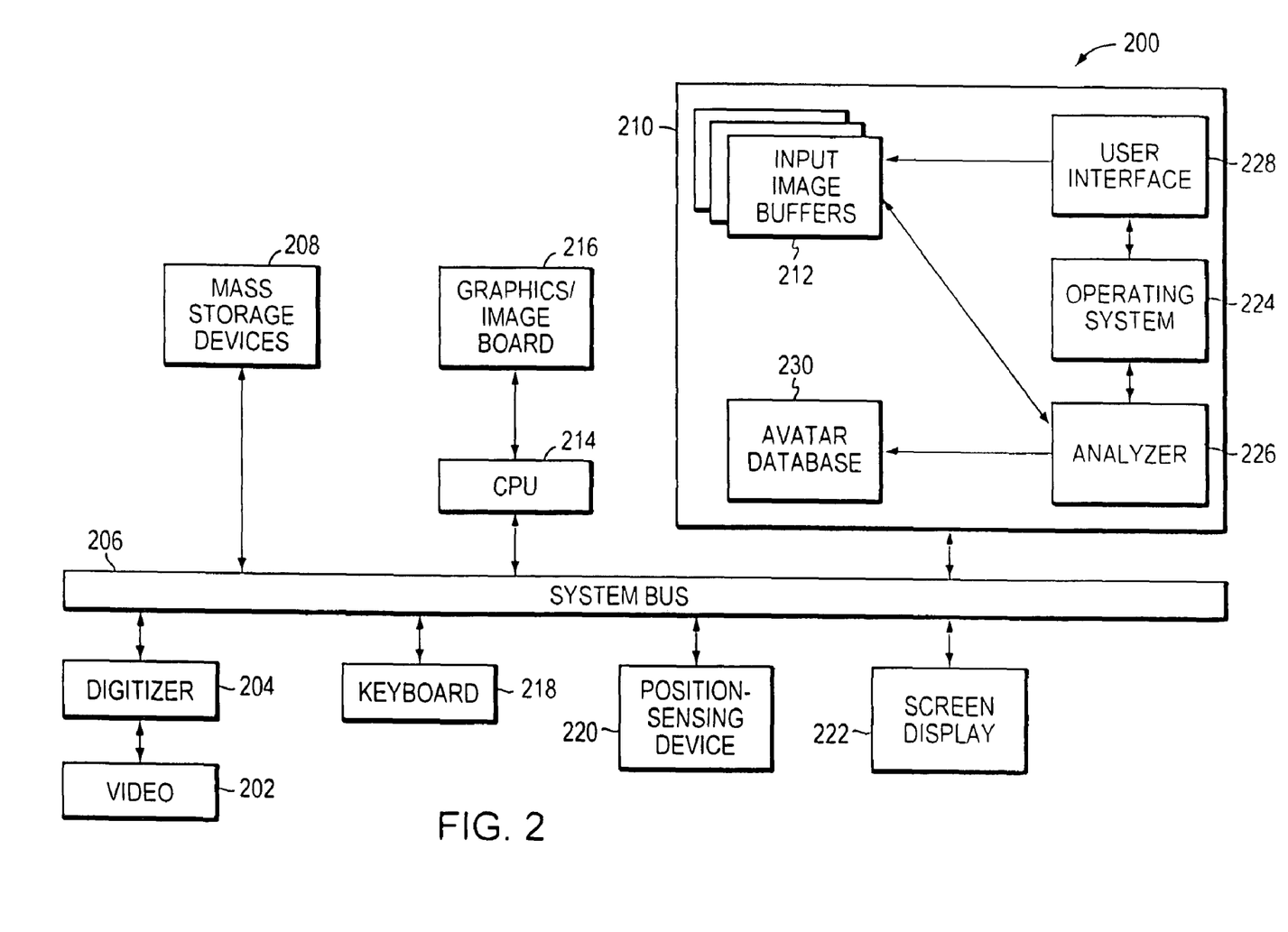
FIG. 2 is a block diagram showing a representative hardware environment for the present invention.

Refer now to FIG. 2, which illustrates a hardware system 200 incorporating the invention. As indicated therein, the system includes a video source 202 (e.g., a video camera or a scanning device) which supplies a still input image to be analyzed. The output of the video source 202 is digitized as a frame into an array of pixels by a digitizer 204. The digitized images are transmitted along the system bus 206 over which all system components communicate, and may be stored in a mass storage device (such as a hard disc or optical storage unit) 208 as well as in main system memory 210 (specifically, within a partition defining a series of identically sized input image buffers) 212.

The operation of the illustrated system is directed by a central-processing unit ("CPU") 214. To facilitate rapid execution of the image-processing operations hereinafter described, the system preferably contains a graphics or image-processing board 216; this is a standard component well-known to those skilled in the art.

The user interacts with the system using a keyboard 218 and a position-sensing device (e.g., a mouse) 220. The output of either device can be used to designate information or select particular points or areas of a screen display 220 to direct functions performed by the system.

The main memory 210 contains a group of modules that control the operation of the CPU 212 and its interaction with the other hardware components. An operating system 222 directs the execution of low-level, basic system functions such as memory allocation, file management and operation of mass storage devices 208. At a higher level, the analyzer 226, implemented as a series of stored instructions, directs execution of the primary functions performed by the invention, as discussed below; and instructions defining a user interface 228 allow straightforward interaction over screen display 222. The user interface 228 generates words or graphical images on the display 222 to prompt action by the user, and accepts commands from the keyboard 218 and/or position-sensing device 220. Finally, the memory 210 includes a partition 230 for storing for storing a database of 3D candidate avatars, as described above.

The contents of each image buffer 212 define a "raster," i.e., a regular 2D pattern of discrete pixel positions that collectively represent an image and may be used to drive (e.g., by means of image-processing board 216 or an image server) screen display 222 to display that image. The content of each memory location in a frame buffer directly governs the appearance of a corresponding pixel on the display 222.

It must be understood that although the modules of main memory 210 have been described separately, this is for clarity of presentation only; so long as the system performs all the necessary functions, it is immaterial how they are distributed within the system and the programming architecture thereof. Likewise, though conceptually organized as grids, pixelmaps need not actually be stored digitally in this fashion. Rather, for convenience of memory utilization and transmission, the raster pattern is usually encoded as an ordered array of pixels.

Figure 3:
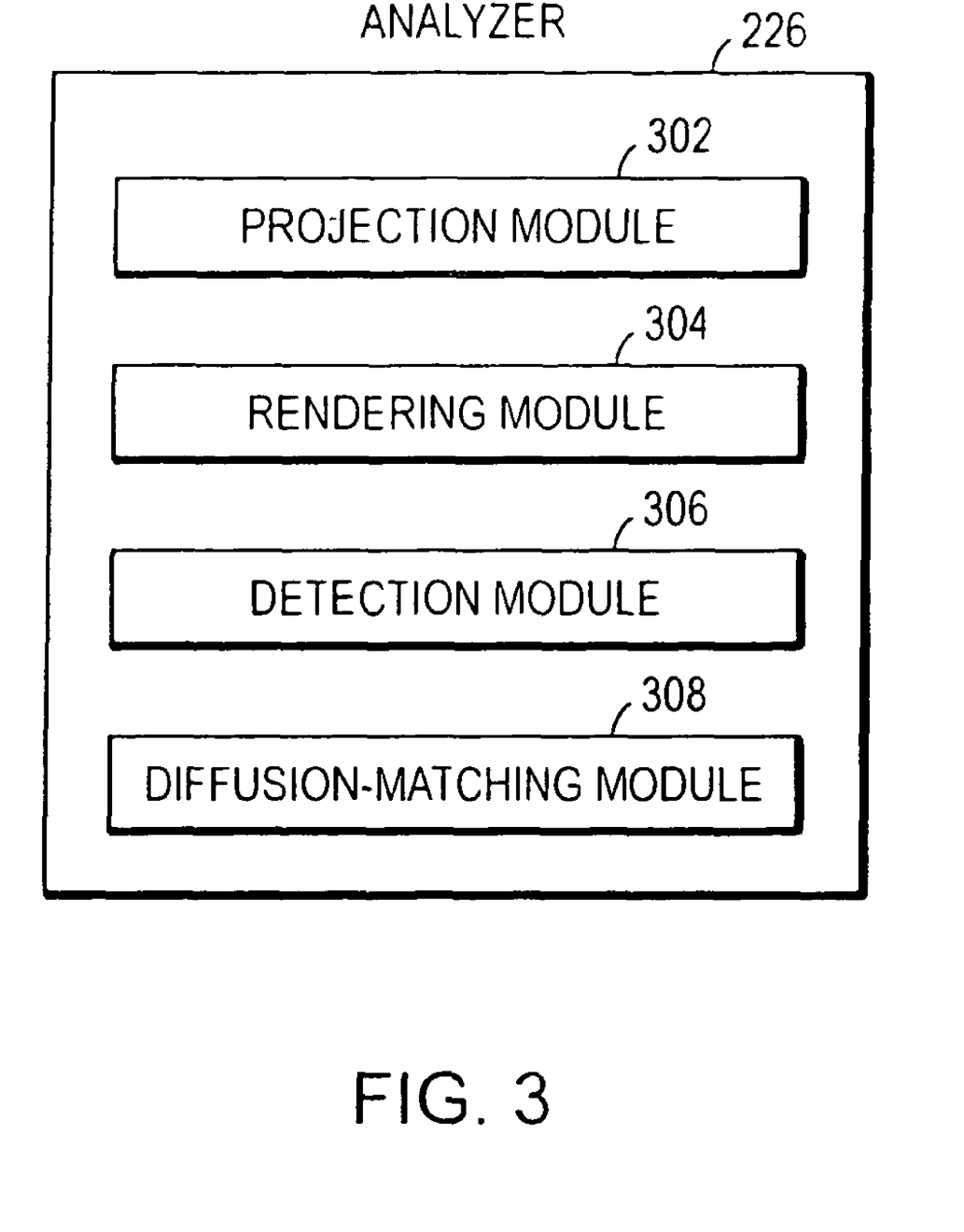
FIG. 3 is a block diagram showing components of the analyzer illustrated in FIG. 3.

As noted above, execution of the key tasks associated with the present invention is directed by the analyzer 226, which governs the operation of the CPU 212 and controls its interaction with main memory 210 in performing the steps necessary to perform detection of the target in the source imagery, the pose-invariant search over the set of candidate 3D representations, and the diffusion-matching of candidate 3D representation geometry and photometry to optimally match a candidate 3D representations to a target multifeatured object. FIG. 3 illustrates the components of a preferred implementation of the analyzer 226. The projection module 302 takes a 3D model and makes a 2D projection of it onto any chosen plane. In general, an efficient projection module 302 will be required in order to create numerous projections over the space of rotations and translations for each of the candidate avatars. The rendering module 304 allows for the rapid projection of a 3D avatar into 2D with the option of including the specification of the avatar lighting. Ordinarily, a separate rendering buffer is allocated to each projected texture field $\Pi^a$. The 2D projection corresponds to the chosen lighting of the 3D avatar. The detection module 306 searches for specific viewpoint-invariant and lighting-invariant feature items in the 2D source projection. The features may include eyes, nostrils, lips, and may incorporate probes that operate at several different pixel scales. The diffusion-matching module 308 performs a controlled search of the geometric and photometric properties of a candidate 3D avatar to determine the viewpoint, geometry and lighting of the candidate which optimally fits the source imagery. The diffusion-matching module may use the pose determined by the viewpoint-invariant search as its starting point, or it may use the pose determined by the jump-detection module 306. Alternatively, the diffusion-matching module may use as input other pose information, such as that determined manually or via other methods.

The detection module 306, execution of the pose-invariant search, and diffusion-matching module 308 may operate in parallel and hierarchically. For example, when many source images are made available, such as from a video source, jump-detection may operate continually on each image. If the jump-detection module 306 detects a potential target, the pose-invariant search may be performed on the detected target. If the pose-invariant search results in a potential candidate avatar, the diffusion-matching proceeds, using the diffusion-matching module 308.

Figure 4:
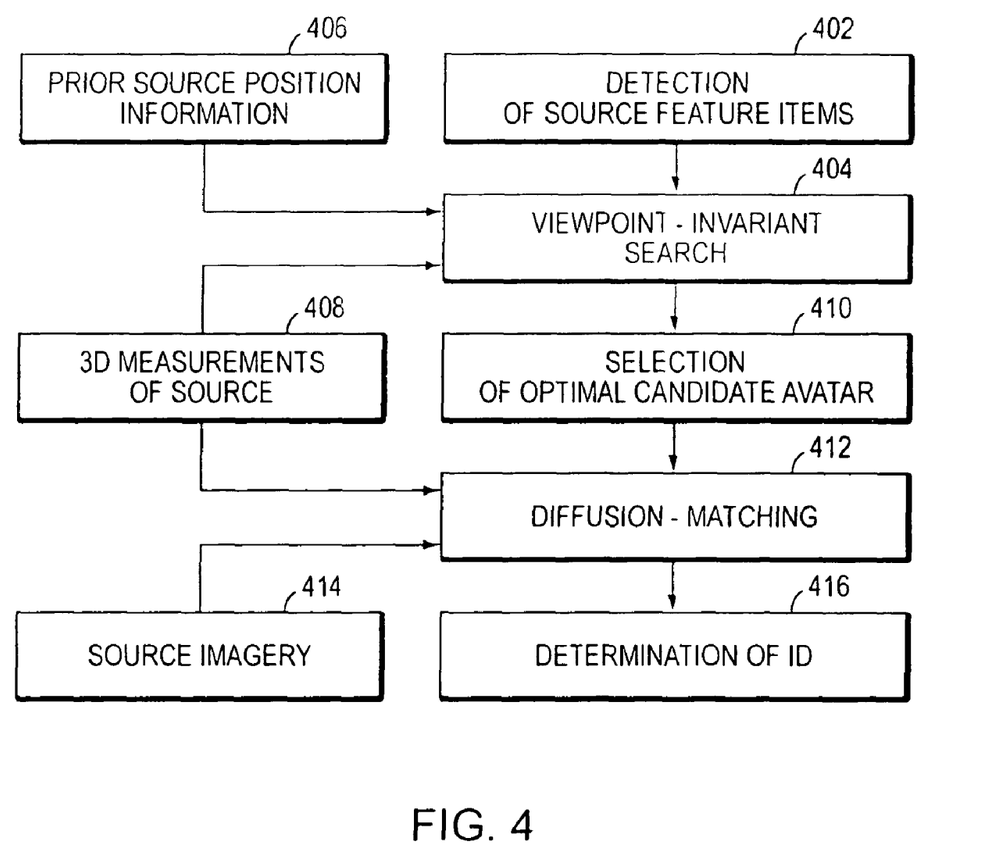
FIG. 4 is a block diagram showing the key functions performed by the analyzer.

FIG. 4 illustrates the functions of the invention performed in main memory. In step 402, the system examines the source imagery using the jump-detection module 306, and automatically detects pose-invariant and lighting-invariant features of a face, such as eyeballs, nostrils, and lips that can be used for matching purposes, as described above. In step 404, the pose-invariant search is performed using the techniques described above. In step 406, any prior information that may be available about the position of the source object with respect to the available 2D projections is added into the computation, as described herein. When 3D measurements of the source are available, this data is used to constrain the rigid-motion search as shown in step 408 and as described above. When the viewpoint-invariant search 404 is completed over all the candidate 3D avatars, the best-fitting avatar is selected in step 410, as described above. Subsequently, the pose, geometry and lighting of the best-fitting avatar located in step 410 is subjected to controlled variations in the diffusion-matching step 412. The projections of these variations in the best-fitting candidate avatar are compared directly with the source imagery 414. 3D measurements 408 of the source object, if available, are used to constrain the diffusion-matching 412. The diffusion-matching step 412 yields a pose, geometry, and lightning for the best-fitting 3D avatar which best matches the source imagery. The analyzer compares the projection of avatar configuration selected by the diffusion-matching process with the source imagery to produce a quality of fit. In step 416, this quality of fit is used to determine whether the candidate is positively identified with the source.

As noted previously, while certain aspects of the hardware implementation have been described for the case where the target object is a face and the reference object is an avatar, the invention is not limited to the matching of faces, but may be used for matching any multifeatured object using a database of reference 3D representations that correspond to the generic type of the target object to be matched.

It will therefore be seen that the foregoing represents a highly extensible and advantageous approach to the generation of 3D models of a target multifeatured object when only partial information describing the object is available. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations (wherein, for example, pixel manipulation and rendering is performed by dedicated hardware components).

What is claimed is:

1. A method of analyzing an image that contains a 2D projection of a source multifeatured object, the method comprising:
   a. providing a plurality of 3D representations of candidate multifeatured objects;
   b. detecting the 2D projection of the source multifeatured object in the image;
   c. searching over rigid motions and deformations of the plurality of 3D representations to locate a best match the candidate 3D representation, the best match 3D representation being the 3D representation among the plurality of 3D representations that produces a 2D projection most resembling the 2D projection of the source multifeatured object,
   wherein said searching involves selecting each 3D representation among the plurality of 3D representations and for each selected 3D representation applying both rigid motion and deformation operators to that selected 3D representation to generate multiple versions of that selected 3D representation, and for each version of that selected 3D representation, computing a measure of fit between that version of that selected 3D representation and the 2D projection of the source multifeatured object, and
   wherein the best match 3D representation is the version of the 3D representation from the plurality of 3D representations that yields a best measure of fit; and
   d. comparing the 2D projection of the source multifeatured object with the best match 3D representation to determine whether the best match 3D representation corresponds to the source multifeatured object.

2. The method of claim 1, wherein detecting the 2D projection of the source multifeatured object involves locating viewpoint-invariant and lighting-invariant feature items in the image.

3. The method of claim 2, wherein detecting is performed substantially in real time.

4. The method of claim 1, wherein searching involves searching each 3D representation of the plurality of 3D representations over at least one of
   (i) a range of virtual lightings so as to match source-object lighting conditions prevailing when the source imagery was captured, and
   (ii) a range of deformations.

5. The method of claim 4 wherein the deformations are small deformations.

6. The method of claim 4 wherein the deformations accommodate movements of parts of the source object.

7. The method of claim 4 wherein the deformations are large deformations.

8. The method of claim 4 wherein the deformations are associated with changes in the source object over time.

9. The method of claim 1, wherein searching further comprises, for each candidate 3D representation, searching over a range of possible 2D projections of the 3D representations without actually generating any projections.

10. The method of claim 1, wherein searching further comprises, for each candidate 3D representation, searching over a range of possible 2D projections and computing an optimal rigid motion of the candidate 3D representation that corresponds to a 2D projection that is optimally consistent with the 2D projection of the source multifeatured object.

11. The method of claim 10 wherein computing the optimal rigid motion involves:
   a. estimating a conditional mean of feature items comprising points, curves, surfaces, and subvolumes in a 3D coordinate space associated with the candidate 3D representation, which feature items are projectionally consistent with feature items in the at least one source 2D projection;
   b. generating, for rigid motions of the candidate 3D representation, minimum mean-squared error estimates between the conditional mean estimate of the projected feature items and corresponding feature items of the candidate 3D representation; and
   c. determining a quality of fit by comparing portions of the projection of the 3D candidate representation and corresponding portions of the source 2D representation, and defining the optimum rigid motion as that corresponding to the best quality of fit.

12. The method of claim 1, wherein comparing results in a positive identification of the candidate 3D representation with the source object when the degree of match between the projection of the 3D representation and the source 2D image exceeds a pre-determined threshold.

13. The method of claim 1 wherein searching over rigid motions and deformations of the plurality of 3D representations to locate the best match 3D representation involves simultaneously searching over rigid motions and deformations of the plurality of 3D representations to locate the best match 3D representation.

14. A method of analyzing an image that contains a 2D projection of a source face, the method comprising:
   a. providing a plurality of candidate 3D avatars;
   b. detecting the 2D projection of the source face in an image;
   c. searching over rigid motions and deformations of the plurality of candidate 3D avatars to locate a best match 3D avatar, the best match 3D avatar being the candidate 3D avatar among the plurality of candidate 3D avatars that produces a 2D projection most resembling the 2D projection of the source face,
   wherein said searching involves selecting each candidate 3D avatar among the plurality of candidate 3D avatars and for each selected candidate 3D avatar applying both rigid motion and deformation operators to that selected candidate 3D avatar to generate multiple versions of that selected candidate 3D avatar, and for each version of that selected candidate 3D avatar, computing a measure of fit between that version of that selected candidate 3D avatar and the 2D projection of the source face, and
   wherein the best match 3D avatar is the version of the candidate 3D avatar from the plurality of candidate 3D avatars that yields a best measure of fit; and
   d. comparing the 2D projection of the source face with the best match 3D avatar to determine whether the best match 3D avatar corresponds to the source face.

15. The method of claim 14, wherein detecting the 2D projection of the source face involves locating viewpoint-invariant and lighting-invariant feature items in the image.

16. The method of claim 15, wherein detecting is performed substantially in real time.

17. The method of claim 14, wherein searching involves searching each candidate 3D avatar of the plurality of candidate 3D avatars over at least one of:
   (i) a range of virtual lightings so as to match source-face lighting conditions prevailing when the source imagery was captured, and
   (ii) a range of deformations.

18. The method of claim 17 wherein the deformations are small deformations.

19. The method of claim 17 wherein the deformations accommodate facial movements.

20. The method of claim 17 wherein the deformations are large deformations.

21. The method of claim 17 wherein the deformations are associated with changes in the source face over time.

22. The method of claim 14, wherein searching comprises, for each candidate 3D avatar, searching over a range of possible 2D projections of the 3D avatar without actually generating any projections.

23. The method of claim 14, wherein searching further comprises, for each candidate 3D avatar, searching over a range of possible 2D projections and computing an optimal rigid motion of the candidate 3D avatar that corresponds to a 2D projection that is optimally consistent with the 2D projection of the source face.

24. The method of claim 23 wherein computing the optimal rigid motion involves:
   a. estimating a conditional mean of feature items comprising points, curves, surfaces, and subvolumes in a 3D coordinate space associated with the candidate 3D avatar, which feature items are projectionally consistent with feature items in the at least one source 2D projection;
   b. generating, for rigid motions of the candidate 3D avatar, minimum mean squared error estimates between the conditional mean estimate of the projected feature items and corresponding feature items of the candidate 3D avatar; and
   c. determining a quality of fit by comparing portions of the projection of the candidate 3D avatar and corresponding portions of the source 2D representation, and defining the optimum rigid motion as that corresponding to the best quality of fit.

25. A system for analyzing an image that contains a 2D projection of a source multifeatured object, the system comprising:

a. a database comprising a plurality of 3D representations of candidate multifeatured objects;

b. a detection module for detecting the 2D projection of the source multifeatured object in the image;

c. an analyzer implemented least in part by a central processing unit for (i) searching over rigid motions and deformations of the 3D representations to locate a best match 3D representation, the best match 3D representation being the 3D representation among the plurality of 3D representations that produces a 2D projection most resembling the 2D projection of the source multifeatured object, and (ii) comparing the 2D projection of the source multifeatured object with the best match 3D representation to determine whether the best match 3D representation corresponds to the source multifeatured object, wherein said searching involves selecting each 3D representation among the plurality of 3D representations and for each selected 30 representation applying both rigid motion and deformation operators to that selected 3D representation to generate multiple versions of that selected 3D representation, and for each version of that selected 3D representation, computing a measure of fit between that version of that selected 3D representation and the 2D projection of the source multifeatured object, and wherein the best match 3D representation is the version of the 3D representation from the plurality of 3D representations that yields a best measure of fit.

26. The method of claim 14, wherein comparing results in a positive identification of the candidate 3D avatar with the source face when the degree of match between the projection of the 3D avatar and the source 2D image exceeds a predetermined threshold.

27. The method of claim 14 wherein searching over rigid motions and deformations of the plurality of candidate 3D avatars to locate the best match 3D avatar involves simultaneously searching over rigid motions and deformations of the plurality of candidate 3D avatars to locate the best match 3D avatar.

28. The system of claim 24 wherein searching over rigid motions and deformations of the plurality of 3D representations to locate the best match 3D representation involves simultaneously searching over rigid motions and deformations of the plurality of 3D representations to locate the best match 3D representation.

29. The system of claim 28, wherein the detection module detects the 2D projection of the source multifeatured object by locating viewpoint-invariant and lighting-invariant feature items in the image.

30. The system of claim 29, wherein the detection module performs the detection substantially in real time.

31. The system of claim 28, wherein the analyzer further comprises a diffusion-matching module which searches 2D projections of the 3D candidate representations generated from at least one of:

(i) a range of virtual lightings so as match source-object lighting conditions prevailing when the source imagery was captured, and (ii) a range of deformations.

32. The system of claim 31 wherein the deformations are small deformations.

33. The system of claim 31 wherein the deformations accommodate movements of parts of the source object.

34. The system of claim 31 wherein the deformations are large deformations.

35. The system of claim 31 wherein the deformations are associated with changes in the source object over time.

36. The system of claim 28 wherein the analyzer searches, for each 3D representation among the plurality of 3D representations, over a range of possible 2D projections of that 3D representation without actually generating any projections.

37. The system of claim 36, wherein the analyzer computes the optimum rigid motion of the 3D representation that corresponds to a 2D projection that is optimally consistent with the 2D projection of the source multifeatured object.

38. The system of claim 37, wherein the analyzer is configured to determine the optimum rigid motion by:

a. estimating a conditional mean of feature items comprising points, curves, surfaces, and subvolumes in a 3D coordinate space associated with the candidate 3D representation, which feature items are projectionally consistent with feature items in the at least one source 2D projection;

b. generating, for rigid motions of the candidate 3D representation, minimum mean-squared error estimates between the conditional mean estimate of the projected feature items and corresponding feature items of the candidate 3D representation; and c. determining a quality of fit by comparing portions of the projection of the candidate 3D representation and corresponding portions of the source 2D representation, and defining the optimum rigid motion as that corresponding to the best quality of fit.

39. The system of claim 28, wherein the analyzer outputs a positive identification of the best match 3D representation with the source object when the degree of correspondence between the projection of the 3D representation and the source 2D image exceeds a pre-determined threshold.

40. A system for analyzing an image that contains a 2D projection of a source face, the system comprising:

a. a database comprising a plurality of candidate 3D avatars;

b. a detection module for detecting the 2D projection of the source face in ai* the image;

c. an analyzer implemented at least in part by a central processing unit for (i) searching over rigid motions and deformations of the candidate 3D avatars to locate a best match 3D avatar, the best match 3D avatar being the candidate 3D avatar among the plurality of candidate 3D avatars that produces a 2D projection most resembling the 2D projection of the source face, and (ii) comparing the 2D projection of the source face with the best match 3D avatar to determine whether the best match 3D avatar corresponds to the source face, wherein said searching involves selecting each candidate 3D avatar among the plurality of candidate 3D avatars and for each selected candidate 313 avatar applying both rigid motion and deformation operators to that selected candidate 3D avatar to generate multiple versions of that selected candidate 3D avatar, and for each version of that selected candidate 3D avatar, computing a measure of fit between that version of that selected candidate 3D avatar and the 2D projection of the source face, and wherein the best match 3D avatar is the version of the candidate 3D avatar from the plurality of candidate 3D avatars that yields a best measure of fit.

41. The system of claim 40, wherein the detection module detects the 2D projection of a face by locating viewpoint-invariant and lighting-invariant feature items in the source 2D image.

42. The system of claim 41, wherein the detection module performs the detection substantially in real time.

43. The system of claim 40, wherein the analyzer further comprises a diffusion-matching module which searches 2D projections of the candidate avatar generated from at least one of:
  (i) a range of virtual lightings so as match source-head lighting conditions prevailing when the source imagery was captured, and
  (ii) a range of deformations.

44. The system of claim 40 wherein the analyzer searches, for each candidate 3D avatar, over a range of possible 2D projections of the 3D avatars without actually generating any projections.

45. The system of claim 44, wherein the analyzer computes the optimum rigid motion of the candidate 3D avatar that corresponds to a 2D projection that is optimally consistent with the 2D projection of the source face.

46. The system of claim 45, wherein the analyzer is configured to determine the optimum rigid motion by:
  a. estimating a conditional mean of feature items comprising points, curves, surfaces, and subvolumes in a 3D coordinate space associated with the candidate 3D avatar, which feature items are projectionally consistent with feature items in the at least one source 2D projection;
  b. generating, for rigid motions of the candidate 3D avatar, minimum mean-squared error estimates between the conditional mean estimate of the projected feature items and corresponding feature items of the candidate 3D avatar; and
  c. determining a quality of fit by comparing portions of the projection of the candidate 3D avatar and corresponding portions of the source 2D representation, and defining the optimum rigid motion as that corresponding to the best quality of fit.

47. The system of claim 40, wherein the analyzer is configured to output a positive identification of the candidate 3D avatar with the source face when the degree of match between the projection of the 3D avatar and the source 2D image exceeds a predetermined threshold.

48. The system of claim 40 wherein searching over rigid motions and deformations of the plurality of candidate 3D avatars to locate the best match 3D avatar involves simultaneously searching over rigid motions and deformations of the plurality of candidate 3D avatars to locate the best match 3D avatar.

\* \* \* \* \*